(12) United States Patent
Auburger et al.

(10) Patent No.: US 9,253,960 B2
(45) Date of Patent: Feb. 9, 2016

(54) MILKING UNIT FOR MILKING AN ANIMAL (71) Applicant: GEA Farm Technologies GmbH, Bönen (DE)

(72) Inventors: Markus Auburger, Lippstadt (DE); Thomas Orban, Dortmund (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 14/162,846

(22) Filed: Jan. 24, 2014

(65) Prior Publication Data

US 2014/0137803 A1 May 22, 2014

Related U.S. Application Data (62) Division of application No. 12/152,076, filed on May 12, 2008, now Pat. No. 9,060,493.

(30) Foreign Application Priority Data

May 11, 2007 (DE) .......................... 10 2007 022 803

(51) Int. Cl.
*A01J 5/00* (2006.01)
*A01J 5/04* (2006.01)

(52) U.S. Cl.
CPC ....................... *A01J 5/044* (2013.01)

(58) Field of Classification Search
USPC .................... 119/14.01–14.03, 14.51, 14.47; 403/357, 373, 360
See application file for complete search history.

(56) References Cited

U.S. PATENT DOCUMENTS

| | | | |
|---|---|---|---|
| 289,546 A | 12/1883 | Martin |
| 870,785 A | 11/1907 | Jacques |
| 970,816 A | 9/1910 | Hankins |
| 1,111,978 A | 9/1914 | Uebler |
| 1,358,667 A | 11/1920 | Williams et al. |
| 1,700,025 A | 1/1929 | Cockburn |
| 1,822,680 A | 9/1931 | Taylor |
| 2,099,884 A | 11/1937 | Green |
| 2,639,840 A | 5/1953 | Wons |
| 2,690,734 A | 10/1954 | Heckendorf |
| 2,694,379 A | 11/1954 | Hein |

(Continued)

FOREIGN PATENT DOCUMENTS

| | | |
|---|---|---|
| DE | 3217865 | 1/1983 |
| DE | 3429428 | 11/1985 |

(Continued)

OTHER PUBLICATIONS

U.S. Appl. No. 60/928,847, filed May 11, 2007.

(Continued)

*Primary Examiner* — Richard Price, Jr.
(74) *Attorney, Agent, or Firm* — Smith Law Office; Jeffry W. Smith (57) ABSTRACT

A milking unit is proposed, comprising at least one milk hose, having a first end section and a second end section, and a milk collecting component, which is connected to the first end section of the milk hose. The milk collecting component has at least one coupling element, which cooperates with the first end section of the milk hose. A clamping element is provided, which cooperates with the coupling element so that an essentially fluid-tight connection is generated between the milk hose and the milk collecting component.

10 Claims, 10 Drawing Sheets

(56) References Cited

U.S. PATENT DOCUMENTS

| | | | |
|---|---|---|---|
| 3,212,681 | A | 10/1965 | Weikert |
| 3,461,845 | A | 8/1969 | Peterson |
| 4,324,201 | A | 4/1982 | Larson |
| 4,516,592 | A | 5/1985 | Schultz et al. |
| 4,745,881 | A | 5/1988 | Larson |
| 4,756,275 | A | 7/1988 | Larson |
| 4,869,205 | A | 9/1989 | Larson |
| 4,924,809 | A | 5/1990 | Verbrugge |
| 5,080,041 | A | 1/1992 | Steingraber |
| 5,125,909 | A | 6/1992 | Heimberger |
| 5,435,916 | A | 7/1995 | Schwartz |
| 5,572,947 | A | 11/1996 | Larson et al. |
| 5,848,738 | A | 12/1998 | Sundby et al. |
| 5,934,222 | A | 8/1999 | Hwang |
| 6,039,001 | A | 3/2000 | Sanford |
| 6,427,624 | B1 | 8/2002 | Briggs et al. |
| 6,742,475 | B1 | 6/2004 | McLeod et al. |
| 6,895,890 | B1 | 5/2005 | Maier, Jr. |
| 6,895,891 | B2 | 5/2005 | Maier, Jr. et al. |
| 6,895,892 | B2 | 5/2005 | Sellner et al. |
| 6,997,136 | B1 | 2/2006 | Coates |
| 7,121,590 | B1 | 10/2006 | Alveby |
| 7,395,780 | B2 | 7/2008 | Maier, Jr. et al. |
| 7,578,260 | B2 | 8/2009 | Shin |
| 7,637,228 | B2 | 12/2009 | Hatzack et al. |
| 7,650,854 | B2 | 1/2010 | Petterson et al. |
| 7,827,933 | B2 | 11/2010 | Van Den Berg |
| 8,033,247 | B2 | 10/2011 | Torgerson et al. |
| 8,671,886 | B2 | 3/2014 | Auburger et al. |
| 2004/0025794 | A1 | 2/2004 | Maier et al. |
| 2004/0060520 | A1 | 4/2004 | Sellner et al. |
| 2005/0160993 | A1 | 7/2005 | Hatzack et al. |
| 2005/0223999 | A1 | 10/2005 | Maier Jr. et al. |
| 2007/0137582 | A1 | 6/2007 | Boast |
| 2008/0006211 | A1 | 1/2008 | Van Den Berg |
| 2008/0276871 | A1 | 11/2008 | Auburger et al. |
| 2008/0289579 | A1 | 11/2008 | Auburger et al. |
| 2008/0308043 | A1 | 12/2008 | Hatzack et al. |
| 2009/0050062 | A1 | 2/2009 | Auburger et al. |
| 2010/0126422 | A1 | 5/2010 | Auburger et al. |
| 2010/0275849 | A1 | 11/2010 | Wulle et al. |
| 2014/0158053 | A1 | 6/2014 | Auberger et al. |

FOREIGN PATENT DOCUMENTS

| | | |
|---|---|---|
| DE | 10207955 | 9/2003 |
| DE | 10212161 | 10/2003 |
| EP | 1872653 | 1/2008 |
| GB | 552476 | 4/1943 |
| GB | 784008 | 10/1957 |
| GB | 1197747 | 7/1970 |
| GB | 2145915 | 4/1985 |
| WO | 00/69252 | 11/2000 |
| WO | 2007/022950 | 3/2007 |
| WO | 2008/138931 | 11/2008 |
| WO | 2009/147369 | 12/2009 |

OTHER PUBLICATIONS

U.S. Appl. No. 12/152,076, filed May 12, 2008.
U.S. Appl. No. 14/217,277, filed Mar. 17, 2014.
Office Action dated Nov. 4, 2011; U.S. Appl. No. 12/152,000.
PCT/EP08/055852, ISR, IPRP, WO received Dec. 31, 2009, 13 pages.
Restriction Requirement dated Nov. 21, 2011; U.S. Appl. No. 12/451,408.
Amendment dated Dec. 21, 2012; U.S. Appl. No. 12/451,408.
Preliminary Amendment dated May 21, 2012; U.S. Appl. No. 12/451,408.

MILKING UNIT FOR MILKING AN ANIMAL

This application is a divisional of U.S. application Ser. No. 12/152,076, filed May 12, 2008, which claims the benefit of German Application No.: DE 102007022803.3-23, filed May 11, 2007, each of which is incorporated herein by reference in their entireties.

FIELD AND BACKGROUND OF THE INVENTION

The subject matter of the invention relates to a milking unit comprising at least one milk hose having a first end section and a second end section, and a milk collecting component, which is connected to the first end section of the milk hose, a milking unit comprising a milk hose having a first end section and a second end section, and a milking cup having a teat rubber and a milking cup sleeve, the milking cup being connected to the second end section of the milk hose, and a milking unit comprising at least one milk hose having a first end section and a second end section, a milk collecting component, which is connected to the first end section of the milk hose, and at least one milking cup having a teat rubber and a milking cup sleeve, the milking cup being connected to the second end section of the milk hose.

Milking systems are used for milking animals which produce milk, which systems can be of various configurations. The milking operation as such is carried out by means of milking cups that are fitted to the animal's teats. A milking cup comprises a teat rubber arranged in a milking cup sleeve. A pulse space is provided between the teat rubber and the milking cup sleeve. Vacuum pressure and atmospheric pressure are applied to the teat rubber in accordance with the pulsator frequency. For this purpose, the milking cup is connected to a pulsator hose. The milk taken by milking is led away from the milking cup via a milk hose.

Milking systems in which each milk hose is connected to a milk collecting component are known. The milk collecting component has connectors over which the milk hoses are slipped. Each connector has an obliquely trimmed end. The milk hose is clamped off at the obliquely trimmed end when the teat cup hangs down freely from the milk collecting component. Such an arrangement is disclosed by DE-A1-34 29 428 for example.

The milk hose is pushed onto the connector. In this case, a force-locking connection arises between the elastic milk hose, which is composed of black rubber or silicone, and the rigid connector. This force-locking connection must be sufficient e.g. to hold the weight of the milking cluster without the milk hose slipping off the connector, since the situation where the entire milking cluster is held by only one milking cup occurs. At the same time, the connection must be fluid-tight, in particular vacuum-tight, in order that milk can be reliably led away.

Due to the static friction between the milk hose and the connector, it is absolutely necessary for the connector to be free of grease and clean upon the mounting of the milk hose, in order to achieve sufficient adhesion. If this is not the case, then there is the risk of the milk hose slipping off the connector during milking. Once a milk hose has slipped off during milking, it can be mounted onto the connector only with considerable mounting effort. The adhesion is essentially determined by the connector/milk hose material pairing, such that the freedom of choice with regard to the constructional materials is limited.

Milking clusters in which the teat rubber and the milk hose are formed in one piece are known. The teat rubber is subject to wear, such that it is necessary to replace the configuration—known as a monobloc—of the one-piece teat rubber with the milk hose, such that the milk hose is also removed from the milk collecting component.

DE-A1-32 17 865 discloses a fluid-tight hose connection in milking technology, which involves the insertion of a milk hose and a hole in the milk collecting component. The edge of the hole or opening is in engagement with the milk hose. In order to prevent the milk hose from being withdrawn from the hole of the milk component as a result of the forces acting on the milk hose, it is proposed according to DE-A1-32 17 865 that an element is provided which with an edge which is provided above the hole and onto which the milk hose can be placed and by which the milk hose is clamped, the element together with the edge surrounding the milk hose and preventing the milk hose from being able to be withdrawn from the hole.

WO-A2-2007/022950 discloses a fluid-tight hose connection in milking technology, which has a connector and an end region of a hose for connection to the connector of a component of a milking system, at least one holding element and at least one holding contour formed in a manner corresponding to the holding element being provided. The configuration of the holding element and the holding contour results in a positively locking connection between the hose and the connector. In this case, the holding element and the holding contour are formed in such a way that the positively locking connection is not released by the forces acting on the hose connection. The positively locking connection can be supplemented by a force-locking connection. By virtue of the positively locking connection between the connector and the hose, an increased operating period of the hose connection is thereby achieved since no permanent force-locking connection and hence permanent loading of the hose arise. Furthermore, by means of a small prestress with which the hose is fixed onto the connector, the tendency of the milk hose towards ozone cracking is significantly reduced.

Taking this as a point of departure, the present invention is based on the object of further developing the connection between a milk hose and a milk collecting component and/or a milking cup in order to simplify the handling of the hose connection and to reduce the forces acting on the hose connection.

This object is achieved according to the invention by means of a milking unit comprising at least one milk hose having a first end section and a second end section, and a milk collecting component, which is connected to the first end section of the milk hose, and a milking unit comprising a milk hose having a first end section and a second end section, and a milking cup having a teat rubber and a milking cup sleeve, the milking cup being connected to the second end section of the milk hose, and also by means of a milking unit comprising at least one milk hose having a first end section and a second end section, a milk collecting component, which is connected to the first end section of the milk hose, and at least one milking cup having a teat rubber and a milking cup sleeve, the milking cup being connected to the second end section of the milk hose.

The inventive solution is based on the consideration of realizing the sealing and connecting functions separately. For this purpose, in the case of a milking unit comprising at least one milk hose having a first end section and a second end section, and a milk collecting component, which is connected to the first end section of the milk hose, it is proposed that the milk collecting component has at least one coupling element which interacts with the first end section of the milk hose, and that a clamping element is provided, which interacts with the coupling element in such a way that an essentially fluid-tight connection arises between the milk hose and the milk collecting component.

In accordance with a further inventive concept it is proposed that a milking unit comprises a milk hose having a first end section and a second end section, and a milking cup having a teat rubber and a milking cup sleeve, the milking cup being connected to the second end section of the milk hose. The milking unit is distinguished by the fact that the milking cup has at least one coupling element which interacts with the second end section of the milk hose, and that a clamping element is provided, which interacts with the coupling element in such a way that an essentially fluid-tight connection arises between the milk hose and the milking cup. The coupling element can be connected to the milking cup sleeve and/or to the teat rubber. The coupling element can also be an integral part of the teat rubber and/or of the milking cup sleeve.

Yet another inventive concept proposes a milking unit comprising at least one milk hose having a first end section and a second end section, a milk collecting component, which is connected to the first end section of the milk hose, and at least one milking cup having a teat rubber and a milking cup sleeve, the milking cup being connected to the second end section of the milk hose. The milking unit according to the invention is distinguished by the fact that the milk collecting component has at least one first coupling element which interacts with the first end section of the milk hose, and that a first clamping element is provided, which interacts with the first coupling element in such a way that an essentially fluid-tight connection arises between the milk hose and the milk collecting component. The milking cup furthermore has at least one second coupling element which interacts with the second end section of the milk hose. A second clamping element is provided, which interacts with the second coupling element in such a way that an essentially fluid-tight connection arises between the milk hose and the milking cup.

Particular preference is given to a configuration in which the coupling element is formed essentially in frustoconical fashion and preferably projects into the first or second end section of the milk hose. This advantageous development of the milking unit provides a defined sealing area on the coupling element. The coupling element can also be embodied as a sealing element. The frustoconical configuration of the coupling element also results in a self-centering of the milk hose at the coupling element when it is slipped over the coupling element. A force is exerted on the milk hose by means of the clamping element, such that a fluid-tight and mechanically stable connection arises.

Particular preference is given to a configuration of the milking unit which is distinguished by the fact that, at a distance from the base of the frustoconical coupling element, a wall is provided which surrounds said base and extends over at least part of the axial length of the coupling element. The wall preferably surrounds the truncated cone over the whole extent, such that the milk hose is preferably clamped in between the wall and the truncated cone.

Particular preference is given here to a configuration in which the clamping element can be connected to the wall in force-locking and/or positively locking fashion.

There is also the possibility of the wall being embodied in the form of segments which are elastic, such that, given a corresponding configuration of a thread, for example, said segments are pressed in the direction of the end section of the milk hose and against the latter, thus resulting in a clamping connection between the coupling element and the milk hose.

In accordance with yet another advantageous configuration of the milking unit it is proposed that the first and/or second end section of the milk hose has an inner form embodied in a manner corresponding to the coupling element.

According to yet another advantageous configuration of the milking unit it is proposed that the first and/or the second end section of the milk hose has at least one groove into which a collar of the clamping element engages. This ensures that the milk hose cannot be pulled away from the clamping element or coupling element as a result of the milk hose being subjected to tensile stress.

Particular preference is given to a configuration of a milking unit in which the first and/or the second end section of the milk hose has elastic segments. Said elastic segments serve as sealing means.

For an even further improvement of the hose connection, in accordance with yet another advantageous configuration of the milking unit, it is proposed that the clamping element has at least one elastic segment in a radial direction.

The tightness between the milk hose and the milk collecting component or a milking cup can also be improved further by the first and/or a second end section of the milk hose having an adapter. The sealing is effected by the adapter being pressed axially onto the milk collecting component or onto the milking cup.

In order to simplify mounting of the clamping element it is proposed that the clamping element has a passage through which the milk hose extends, the clamping element having a slot through which a section of the milk hose can be led. By virtue of this measure, for example by compressing the milk hose, the latter can be led through the slot into the clamping element, such that the milk hose extends through the passage.

Particular preference is given to a configuration in which a plurality of clamping elements form a clamping unit which is connected to the milk collecting component in a releasable manner. All the connections between the milk hoses and the milk collecting component can be released by releasing the clamping unit.

The milk hose for a milking unit is formed with two opposite end sections and an intermediate region, all the regions being connected to one another in one piece and the intermediate region being produced from a soft material. Furthermore, at least one end section is at least partly produced from at least one hard material.

In this case, a soft material can be for example an elastically deformable material such as rubber, TPE or silicones. For this purpose, it is also possible to use in particular those elastic components which have foodstuff approval for use in milking units.

SUMMARY OF THE INVENTION

In the context of the present invention, a hard material is understood to be in particular a non-elastic material. This can be for example a metallic material or alternatively a plastic that is solid at customary room temperatures. These are in particular solid thermoplastics (TP). Examples of such thermoplastics are polyethylene (PE), polystyrene (PS), polyvinyl chloride (PVC) and polyamide (PA).

The use of different materials on a milk hose makes it possible to configure said milk hose in such a way that it can be connected particularly easily to a milking cup at one end or to a milk collecting component at the other end. At the same time, what is achieved by the intermediate region being formed from the soft material is that the milk hose is still very movable and facilitates use as a result of this. With the aid of an end section produced from a solid material, the end sections of the milk hoses can be configured in such a way that they can be connected to those regions of the milking unit which are to be connected. In this case, optionally one end section or else both end sections can be produced from the hard material. In this case it is possible to establish a connection for example between a milk collecting container and a milking cup by means of a milk hose according to the invention, the milk hose having at both ends specially formed end sections which are formed particularly for connection to the respective milk collecting containers and milking cups of the milking unit.

For this purpose, it is advantageously provided that the at least one end section has connecting means for connection to a milking cup or milk collecting container. As already explained above, this is one of the major areas of use for a milk hose according to the invention. The connection of milking cup and milk collecting container represents a zone subjected to particularly high loading within the milking unit, for which reason the milk hoses used at this location have to be replaced and/or cleaned relatively often. With the aid of the connecting means which are formed on the milk hose and which are formed by the hard material in the end sections, however, the milk hose can now be mounted or exchanged in a particularly simple, time-saving and user-friendly manner. On the one hand, this noticeably facilitates the maintenance of the installation in the course of operation. On the other hand, the milk hoses can also be more frequently changed and subjected to cleaning, for example, which can take place with considerably reduced labour in comparison with milk hoses known hitherto in the prior art.

In this case, it is especially advantageous if the connecting means are formed at least partly in positively locking fashion and comprise latching means, in particular. This establishes a type of plug connection between the milk hose and the adjoining components of the milking unit. This can be formed on one side or on both sides of the milk hose. An embodiment of the connecting means as a latching connection which fixes the milk hose to a milking cup and/or milk collecting container is particularly advantageous in the context of the present invention. Replacement or removal of the milk hose merely requires the release of the latching means and the milk hose can be removed.

An embodiment especially preferred by the invention provides for the end section of the milk hose to have fixing means for connection of a teat rubber. With the aid of such a fixing means, the milk hose can firstly be connected to a teat rubber and then be mounted as a one-piece assembly in the milking unit. During the assembly or maintenance of milking units, this results in a major advantage by virtue of the greatly simplified mounting. This is because in the configuration according to the invention, the milk hose can firstly be connected to the teat rubber via the fixing means. Only afterwards is the loose end of the milk hose led for instance through the milking cup in the milk flow direction, and the teat rubber, which is attached to the opposite end section of the milk hose, is led together with the milk hose into the milking cup. Laborious threading-in of the individual components, as was necessary in the case of multipartite milk hoses and teat rubbers hitherto in the prior art, is thus obviated. The present invention thus combines the advantages of one-piece milk hoses with integrally formed teat rubber with the advantages of multipartite milk hoses, in the case of which teat rubbers and short milk hoses previously had to be mounted separately.

For fault-free mounting it is advantageous, moreover, if positioning means are provided for positioning the teat rubber and milk hose with respect to one another and/or with respect to the milking cup. Teat rubbers fitted for instance in twisted fashion in a milking cup have quite often proved to be a possible fault source in the past. For this reason, the invention provides positioning means which ensure that the teat rubber occupies the correct relative position in relation to the milking cup. For this purpose, by way of example, webs can be provided below a collar of the teat rubber, which webs are inserted into complementarily shaped grooves in the outer wall of the milking cup, and thus form protection against torsion about the longitudinal axis of the milking cup. Similar protection against torsion can, of course, also be provided between the milk hose and the milking cup. As an alternative, however, it is also possible to provide, by itself or in addition to other positioning means, a positioning means between teat rubber and milk hose, such that these can be connected to one another only in a specific position. By using positioning means at the three contact locations, i.e. between teat rubber and milking cup, between milking cup and milk hose, and between milk hose and teat rubber, it is possible to ensure correct mounting of the components. In the simplest case, it is possible for a positioning means to be provided just at one of the contact locations.

For a simple and reliable configuration of the milk hose it is furthermore advantageous if the at least one hard material is at least partly arranged on an outer circumference of the milk hose. As a result of this, for example on the inside of the milk hose, the milk can be conducted via just a single type of material. That is to say that the milk, in flowing through the milk hose, in this case comes into contact only with this one material, which represents a particular simplification from a foodstuffs standpoint. Furthermore, a higher durability with regard to leaks can be achieved as a result of shifting the interfaces between the hard and soft materials to the outer sides of the milk hose. This is because in this case none of the interfaces between the two materials continues from the outside to the inside of the milk hose. Particularly if the hard material forms a sleeve-shaped end section which encloses the soft material, the latter can simultaneously serve as connecting or fixing means and additionally protectively enclose the intermediate region composed of the soft material.

Advantageously, the soft material is an elastomer, such as, for instance, a liquid silicone (LSR), a thermoplastic elastomer (TPE), a rubber or a solid silicone (HTV). Alongside other elastic and foodstuff-approved materials, these materials are available relatively inexpensively, can be processed very well technically and their properties are known.

By contrast, the hard material is preferably a thermoplastic such as, for example, polyethylene, polystyrene, polyvinyl chloride or polyamide. Such thermoplastics are solid at room temperature and can be processed simultaneously by means of known methods for producing work pieces from a plurality of components. By way of example, this may involve a two-component injection-moulding method.

Another preferred embodiment provides for the connecting means and the fixing means to be arranged on the outer circumference of the milk hose. In this embodiment, too, it is possible for the intermediate region produced from a soft material to be formed over the entire length of the hose, and in this case, too, the milk comes into contact only with a single material. The combination of connecting means and fixing means on the outer circumference of the milk hose allows, on the one hand, the milk hose to be connected to one of the components of the milking unit, such as the milk collecting container or the milking cup, for example, and, on the other hand, the teat rubber to be connected to the milk hose via a fixing means, such that both are introduced together into the milking cup, for example, and can be mounted securely there with activation of the connecting means.

A further advantageous embodiment provides for at least one region to be angular. This is advantageous particularly on that side of the milk hose which is remote from the milking cup, said side generally leading into a milk collecting container. On account of the anatomy of the animals, the milk hoses coming from different directions are brought together at a milk collecting container. For this reason, they impinge on the milk collecting container at an inclined angle relative to the vertical direction. Precisely this impingement angle can be simulated by means of an angular end section, as a result of which the milk hose at this location does not have to undergo further deformation and is implemented with care. Moreover, essentially no torques are introduced into the teat. Furthermore, it is advantageous if the milk hose is mounted such that it can be rotated about an approximately vertical axis of rotation, relative to the milk collecting container. Thus, the milk hose can adapt automatically to different teat positions or be adapted by simple manual rotation.

For completely satisfactory operation of a milking unit it is necessary to aerate the milk hose. For this reason, it is preferably provided that at least one end section has an aeration device, which preferably introduces air in the milk flow direction and is arranged in the region of the milking cup. In an embodiment of the milk hose composed of two different materials it is possible to form the aeration device in the hard material, in particular. That end section of the milk hose which is produced from the hard material is appropriate, in particular, for this purpose. In contrast to known aeration devices of milk hoses, separate components can thus be obviated and the aeration device can be produced more cost-effectively. In this case, the aeration device can be arranged as necessary at all regions of the milk hose. Particular preference is given however to embodiments in which the aeration device is arranged in the region of the milking cup. Preference is given in particular to those aeration devices which feed air in a direction which essentially corresponds to the flow direction of the milk taken by milking.

Preferably, the connecting means according to the present invention is formed as a pairing of two hard materials. In this way, by way of example, that end section of the milk hose which is produced from the hard material can be connected to a milking cup produced from metal via a latching connection representing the connecting means.

Elsewhere it is advantageous to form the fixing means as a pairing of a hard material and a soft material. This hard-soft pairing of materials makes it possible to obtain a particularly well-sealing connection between the end section of the milk hose which is produced from the hard material and a teat rubber produced from a soft material.

It is especially advantageous if the connecting means and the fixing means are arranged alongside one another at a common section of the milk hose. This makes it possible for connecting means and fixing means to share a single bearing area on the outer circumference of the milk hose, which is produced from the hard material. Both fixing means therefore produce a bearing onto this outer circumferential area. Particularly if the end section produced from the hard material has a widening in a radial direction towards the end of the hose, it is possible with this widening to insert a teat rubber fixed thereon into a milking cup and subsequently to press the teat rubber against the bottom of the milking cup. The position thus reached is then maintained by means of the latching means provided, such that by simple insertion of the milk hose as far as the stop, i.e. the engagement of the latching means, the milking cup with the teat rubber mounted therein together with connected milk hose can be mounted in a very simple manner.

The milking unit according to the invention, to which the invention furthermore relates, has a plurality of milking cups in which teat rubbers are arranged. The teat rubbers are connected to a milk collecting container via milk hoses, the milk hoses being embodied in the manner of the present invention. Such a milking cluster according to the invention can, as already mentioned above, be produced and maintained in a particularly simple manner. With the milk hoses, the replacement of milk hoses and teat rubbers has become significantly simpler and faster. Moreover, for cleaning purposes, too, milk hoses together with the teat rubbers can be removed and mounted again in a simple manner. This requires neither a high expenditure of force nor a particularly high expenditure of time.

Consequently, a considerable advantage has been obtained with regard to the maintenance outlay and the possible hygiene that can be achieved. Moreover, resources are conserved if a quasi-monobloc composed of two different materials is provided, which can be constructed like a monobloc. Thus, by way of example, the milk hose can be produced from a silicone having a particularly long lifetime and the teat rubber can be produced from a rubber. In this case, the worn teat rubber can be exchanged separately and the milk hose can continue to be used. By contrast, in previous monobloc configurations, in which milk hose and teat rubber are produced in one piece and from one material, it is necessary, if one section has become worn, to dispose of the respective other section as well.

Further advantages and details of the invention are explained on the basis of the exemplary embodiments illustrated in the drawing, without the subject matter of the invention being restricted to these concrete exemplary embodiments.

DETAILED DESCRIPTION OF THE PREFERRED EMBODIMENTS

Figure 1:
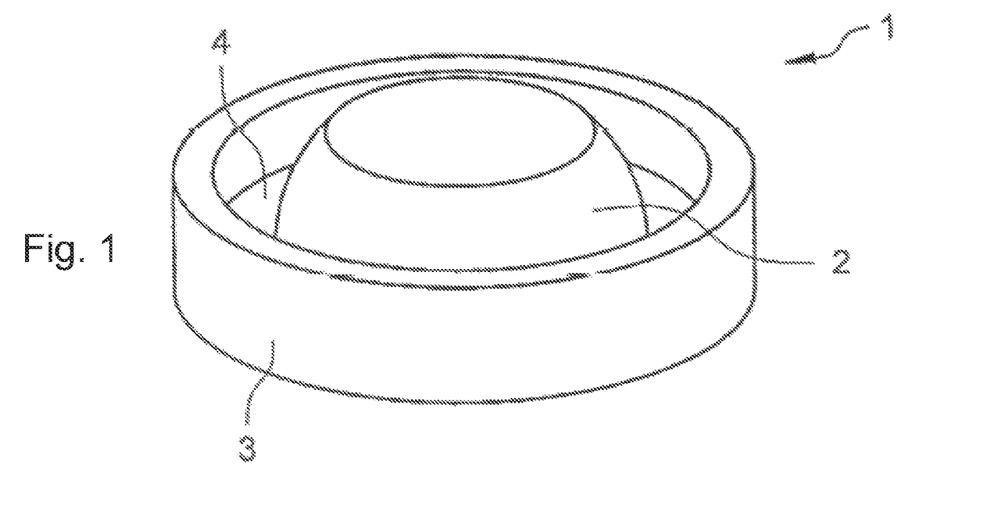
FIG. 1 shows an exemplary embodiment of a coupling element in a perspective view.

FIG. 1 illustrates a coupling element 1 in a perspective view. The coupling element 1 illustrated therein can be formed at the milk collecting component and/or milking cup. At the milking cup, the coupling element can be provided either at the teat rubber or at a milking cup sleeve. The coupling element can be an integral part for example of a cover of a milk collecting component.

Although essentially the connection of a milk hose to a milk collecting component is described below, a connection can also be correspondingly formed between a milking cup and a milk hose.

The coupling element 1 has a frustoconical section 2. The frustoconical section 2 is formed in such a way that it can be introduced into an end section of a milk hose.

A wall 3 surrounding the frustoconical section 2 is provided at a distance from the base of the frustoconical coupling element 1. The wall 3 is connected to the frustoconical section 2 via a bottom 4. The distance between the wall 3 and the frustoconical section 2 is chosen, in the region of the bottom 4, such that it is preferably somewhat smaller than the wall thickness of the milk hose that is introduced into the cavity between the frustoconical section 2 and the bottom 4 and the wall 3.

On the outer circumference the wall 3 can have for example a thread or other connecting means which are suitable and intended for connecting the wall 3 to a clamping element. A force-locking and/or positively locking connection may be involved in this case. A bayonet connection is mentioned by way of example. There is also the possibility of forming a latching connection between the clamping element (not illustrated) and the coupling element.

Figure 2:
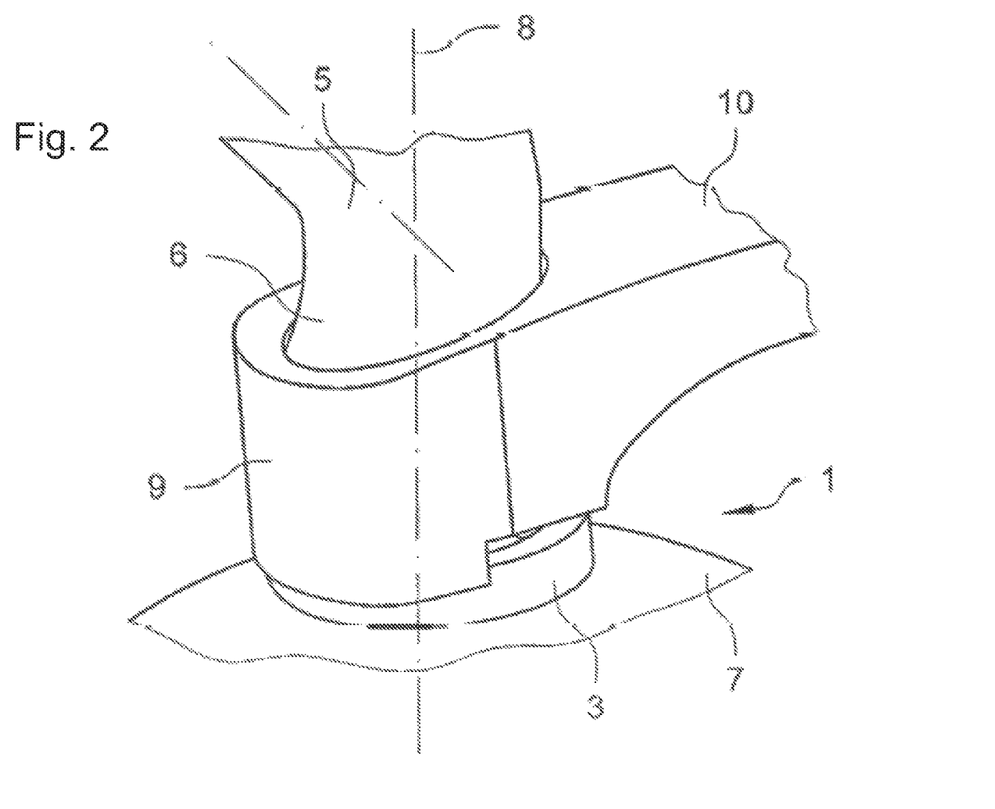
FIG. 2 shows an exemplary embodiment of a milking unit in perspective and schematically.

FIG. 2 shows an exemplary embodiment of a milking unit comprising a milk hose 5 having a first end section 6. In the exemplary embodiment illustrated, the first end section 6 of the milk hose 5 is formed in offset fashion, such that the milk hose projects at a predetermined angle from the milk collecting component 7. The milk hose 5 can be positioned by pivoting about the axis 8. In particular, there is the possibility that the distance of the second end sections (not illustrated) of the adjacent milk hoses can be varied by corresponding pivoting of at least one milk hose about an axis 8. This makes it possible for example to effect adaptation to the milking task. If the milk collecting component is connected to four milk hoses, for example, then the distance between one pair of milk hoses can be different from the distance between the other pair of milk hoses.

The end section 6 of the milk hose 5 projects into the space delimited by the wall 3, the frustoconical section 2 and the bottom 4 of the coupling element 1. A clamping element 9 is provided for fixing the milk hose 5 to the coupling element 1 embodied in accordance with FIG. 1. The clamping element 9 is connected to an arm 10, which is connected to the milk collecting component, such that the coupling element 1 not necessarily and the clamping element 9 have no direct connection of a mechanical type. The milk collecting component 7 can be connected to further milk hoses in accordance with FIG. 2. If a plurality of milk hoses 5 are connected to the milk collecting component 7, then preferably each clamping element 9 has a respective arm 10, which are connected to one another, such that the arms 10 and the clamping elements 9 form a clamping unit that is connected to the milk collecting component for example via a central connecting element.

All connections between the milk hoses and the milk collecting component can be released by releasing the central connecting element.

Figure 3:
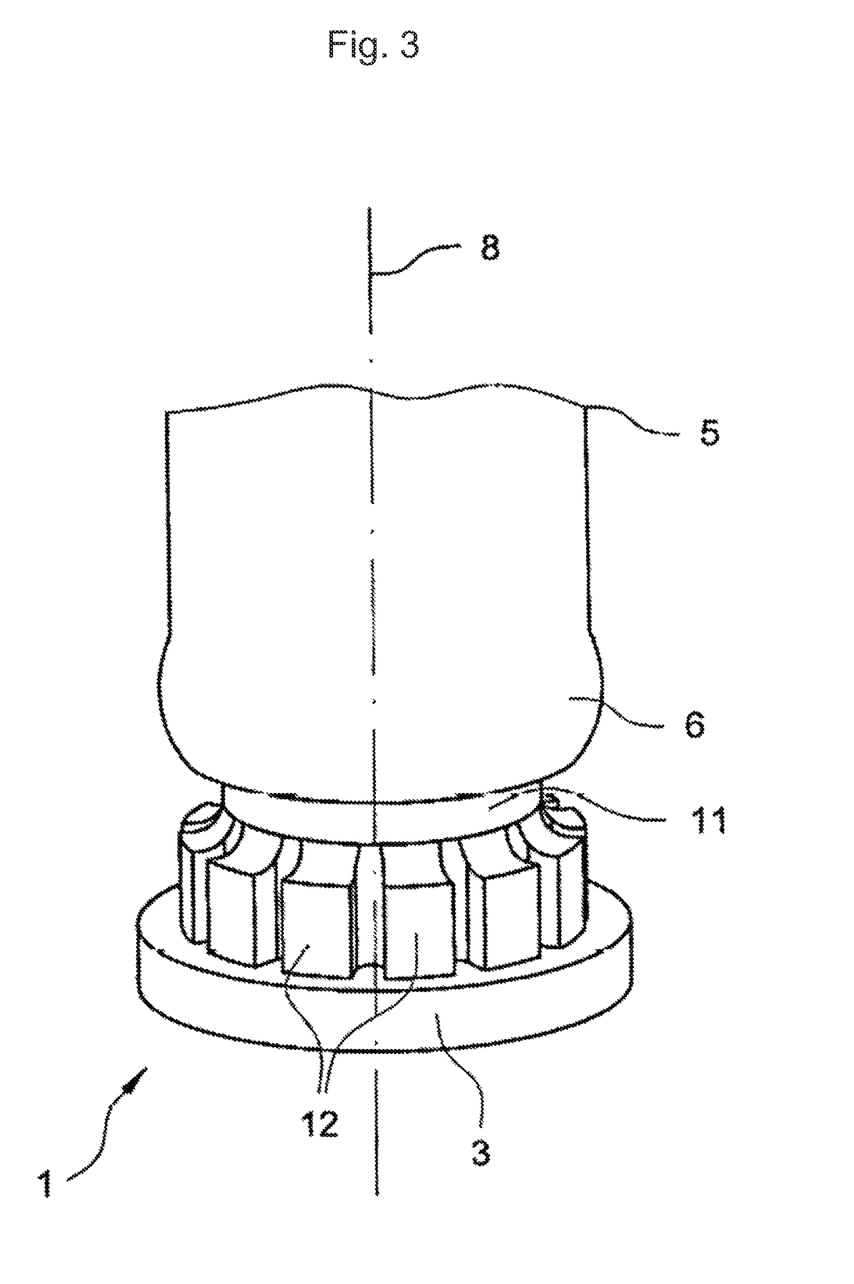
FIG. 3 shows the arrangement of an end section of a milk hose at the coupling element in a perspective view.

FIG. 3 illustrates the arrangement of the first end section 6 of the milk hose 5 with the coupling element 1, wherein a milk collecting component 7 has not been illustrated for the sake of better clarity. The first end section 6 of the milk hose 5 has a peripheral groove 11. A correspondingly formed collar formed on the clamping element 9 engages into said groove 11. It can be seen from the illustration according to FIG. 3 that that section of the milk hose 5 which lies below the groove 11 has segments 12 that are separate from one another. The segments 12 are elastic. They bear on the inner side of the wall 3. If a force directed in the direction of the axis 8 and downwards relative to the illustration in FIG. 3 is exerted on the segments 12 by the clamping element 9, then a deformation of the segments 12 occurs, which generates sufficient clamping force between the coupling element 1 and the clamping element 9, with the result that the milk hose 5 is fixed. On the other hand, the milk hose 5 has an inner contour adapted to the frustoconical section 2 of the coupling element 1, thus giving rise to a relatively large sealing area between the milk hose and the coupling element.

Figure 4:
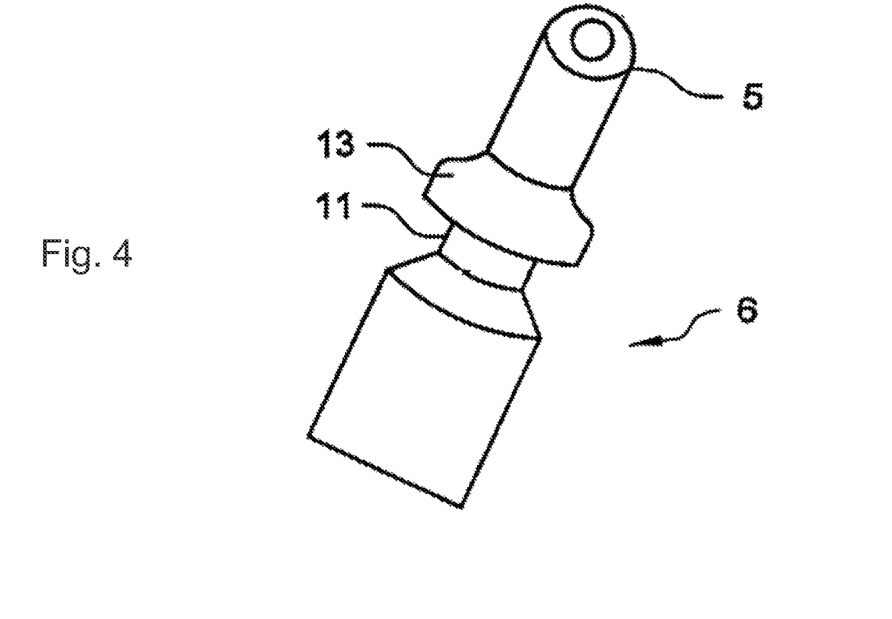
FIG. 4 shows an exemplary embodiment of an end section of a milk hose schematically and in a perspective view.

FIG. 4 illustrates a second exemplary embodiment of an end section 6 of a milk hose 5. The milk hose 5 has a first end section 6 having an enlarged diameter. A groove 11 is provided within the first end section 6. The diameter of the first end section 6 is enlarged by means of a conical extension 13.

Figure 5:
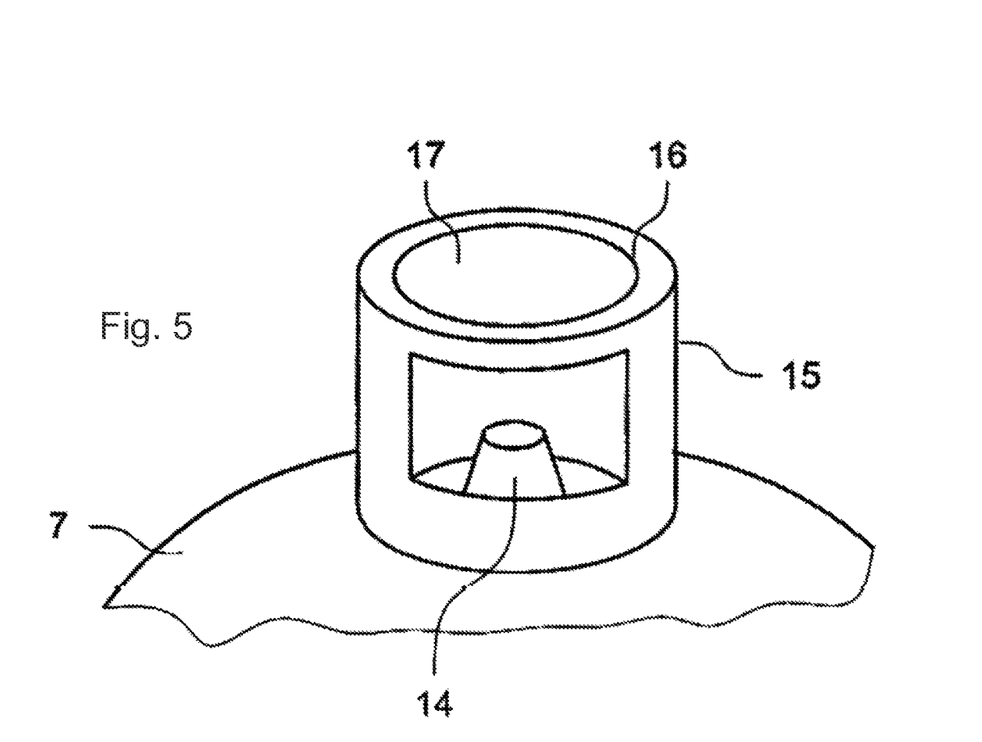
FIG. 5 shows an exemplary embodiment of a coupling element and of a clamping element at the milk collecting component.

In order to fix the milk hose 5 to the milk collecting component 7, this has, as can be seen from FIG. 5, a projection 14. The projection 14 partly projects into the end section 6 of the milk hose 5. The projection 14 forms a coupling element. In the mounted state, the end section 6 projects into the clamping element 15, the edge 16 having a passage opening 17, into which the groove 11 of the first end section 6 projects. The clamping element 15 is preferably screwed to the milk collecting component 7.

Figure 6:
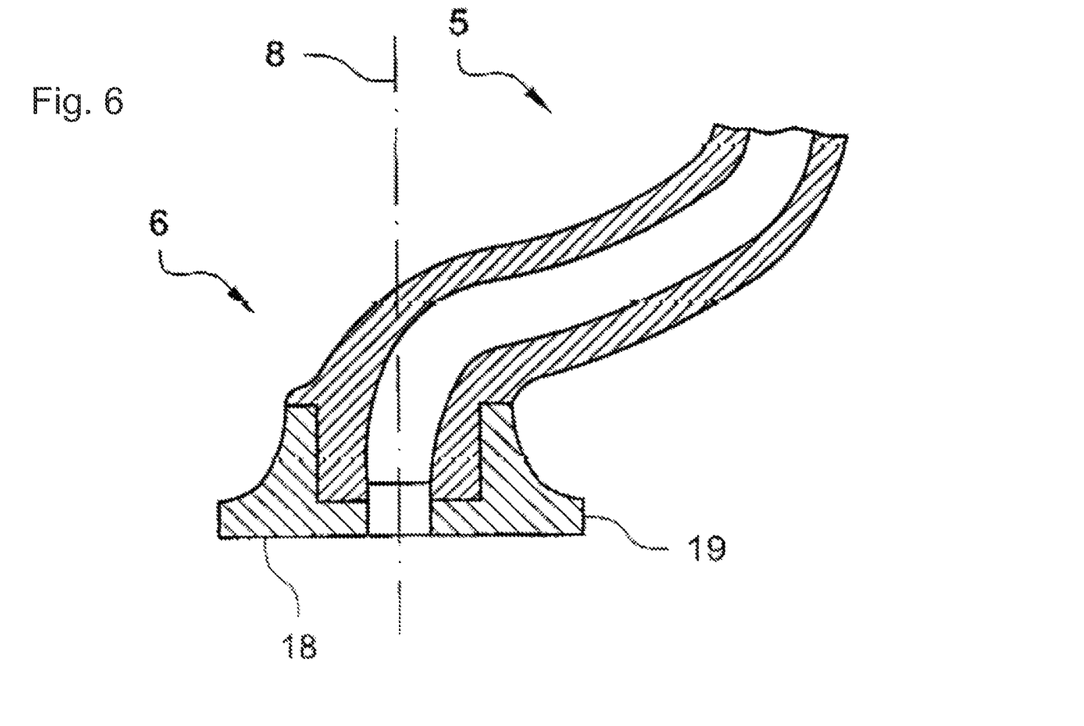
FIG. 6 shows a section of a milk hose in a sectional view with an adapter.
Figure 7:
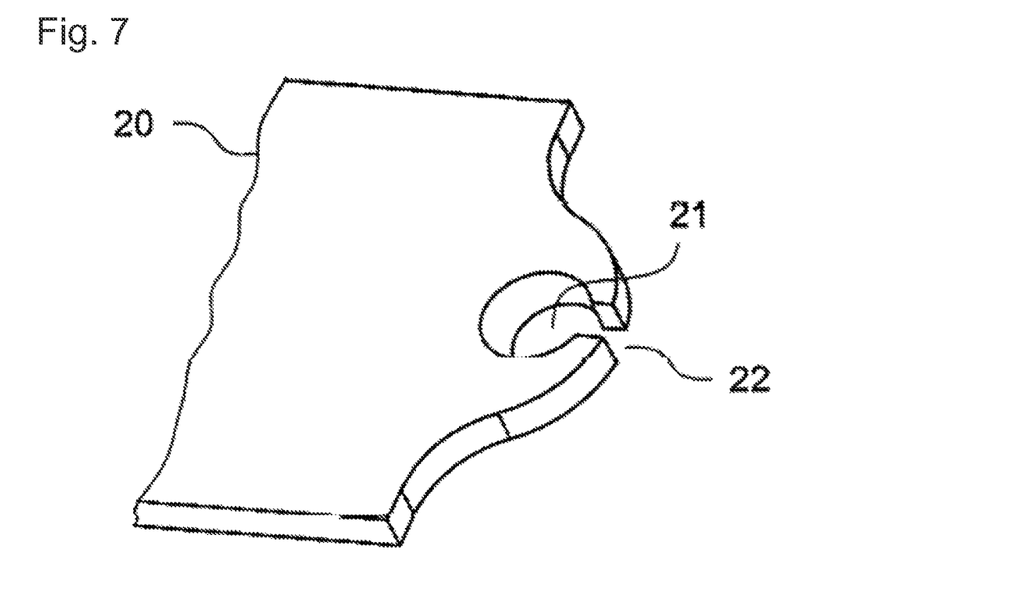
FIG. 7 shows an exemplary embodiment of a clamping element.

FIG. 6 illustrates a milk hose 5 formed in S-shaped fashion. The first end region 6 of the milk hose 5 has an adapter 18. The adapter 18 is preferably formed from a different material from the material of the milk hose 5. In particular, the adapter 18 is formed from a material that is harder than the material of the milk hose 5. The adapter 18 and the milk hose 5 are preferably formed in such a way that they form a structural unit. This structural unit can be produced according to the multicomponent injection-moulding method. The adapter 18 surrounds the lateral surface of the end section 6 of the milk hose 5. It has a flange 19, which interacts with a coupling element (not illustrated). A clamping element 20 is provided for fixing the milk hose 5 to a milk collecting component and/or a milking cup, said clamping element being illustrated in FIG. 7. The clamping element 20 has a passage hole 21, which surrounds the adapter 18 in the mounted state. A slot 22 is provided for introducing the adapter 18 into the passage hole 21. The slot 22 has a width such that a region between the end sections of the milk hose 5 can be led through said slot when the milk hose 5 is compressed such that it has an essentially elliptical cross section. The clamping element 20 can be directly or indirectly connected to a milk collecting component or a milking cup.

The S-shaped configuration of the milk hose also opens up the possibility of varying the distance between two adjacent end sections or milking cups. This can be effected by pivoting at least one of the adjacent milk hoses about corresponding axes 8.

Figure 8:
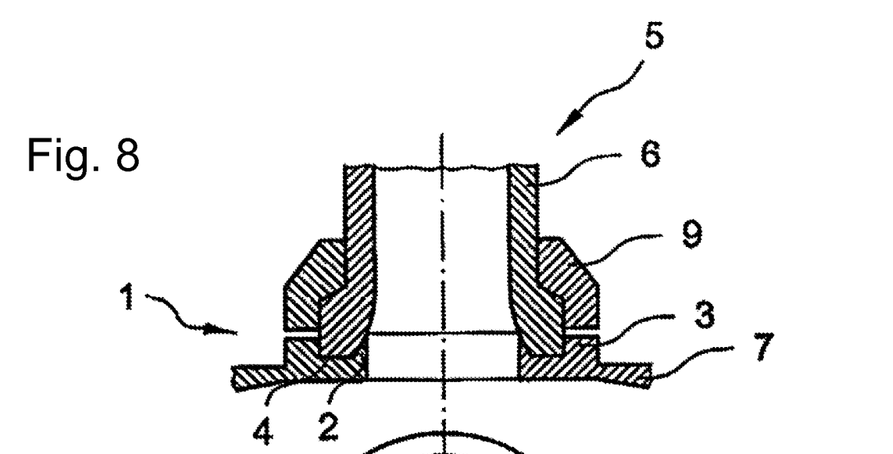
FIG. 8 shows a connection of a milk hose to a milk collecting component schematically and in a sectional illustration.
Figure 9:
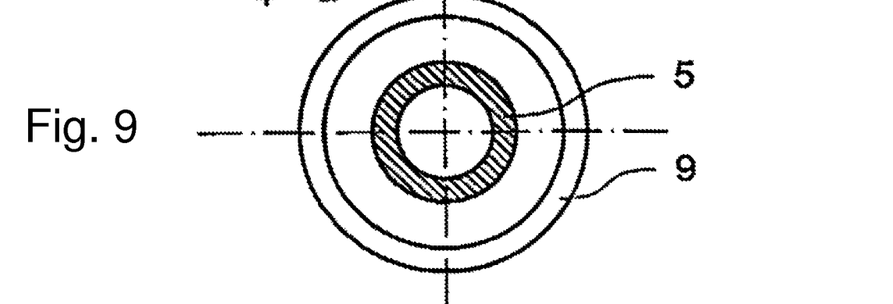
FIG. 9 shows a plan view of the connection according to FIG. 8.
Figure 10:
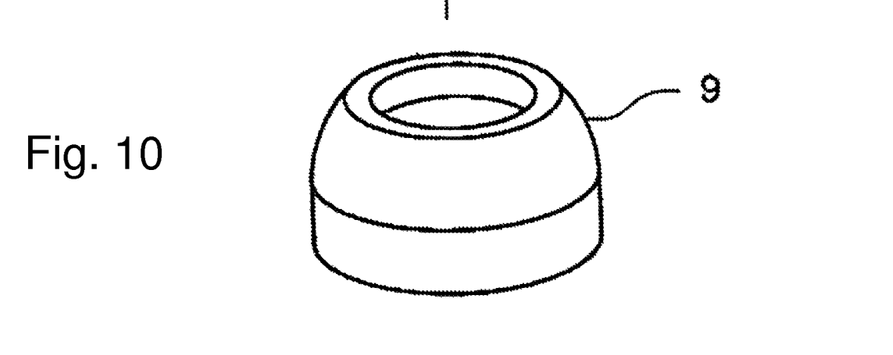
FIG. 10 shows a clamping element in perspective.
Figure 11:
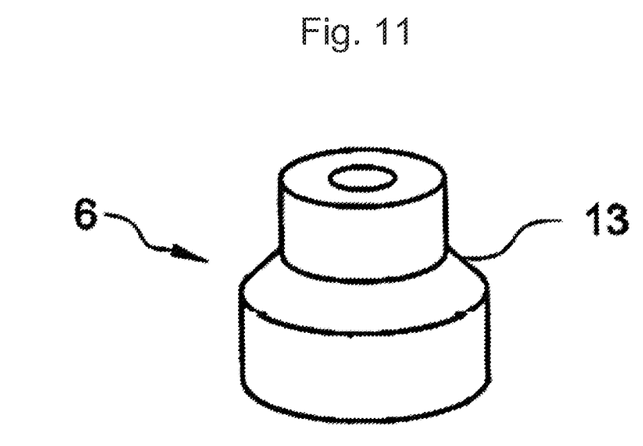
FIG. 11 shows an end section of the milk hose according to FIG. 8 in a perspective view.
Figure 12:
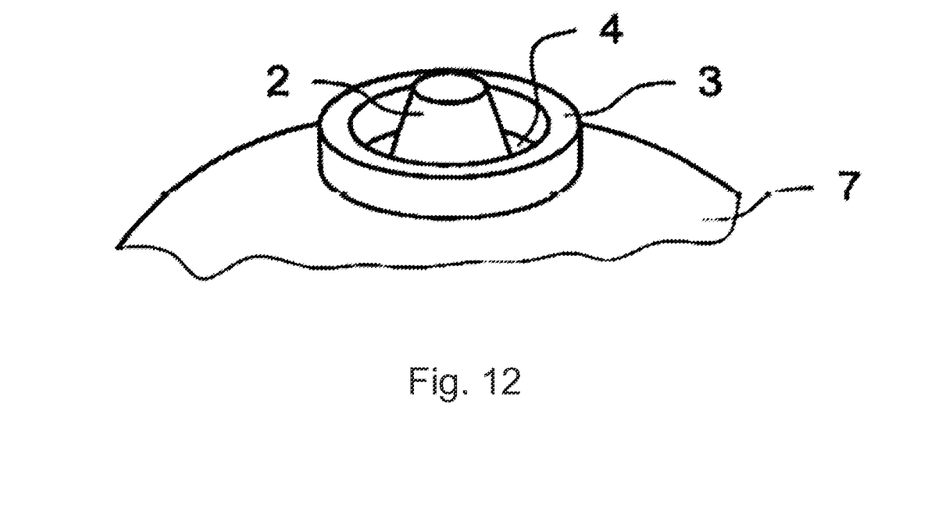
FIG. 12 shows a coupling element in perspective.
Figure 13:
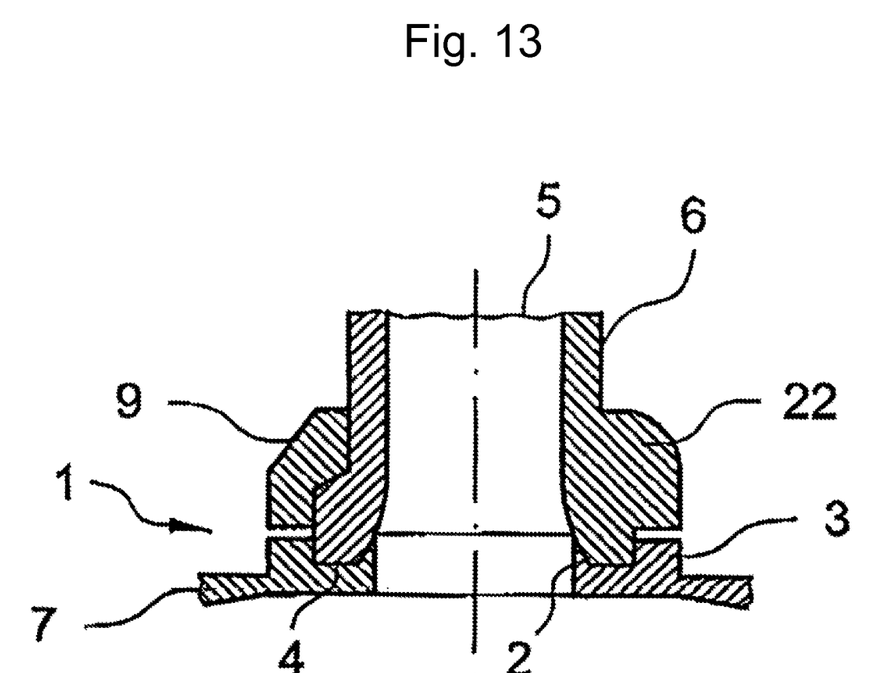
FIG. 13 shows an illustration of a connection between a milk hose and a milk collecting component schematically and in sectional view.
Figure 14:
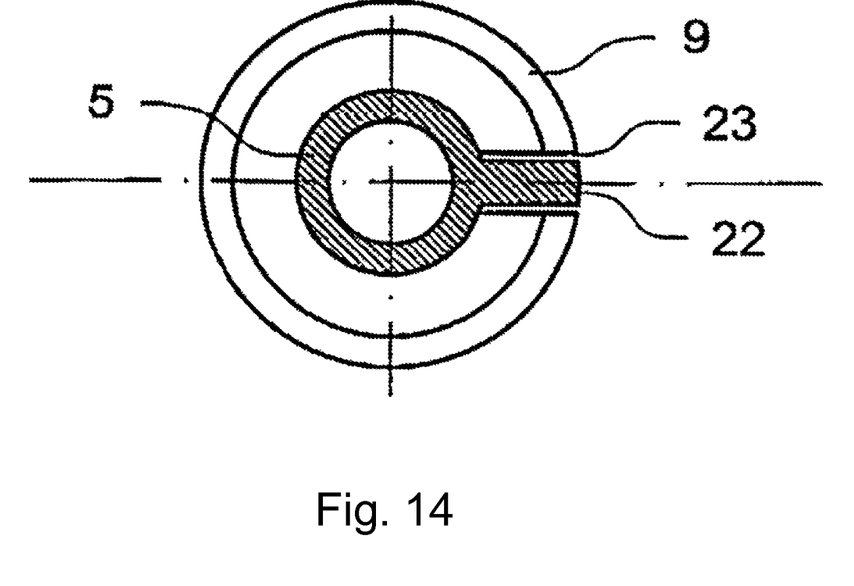
FIG. 14 shows the plan view of the connection according to FIG. 13.

FIG. 8 illustrates a connection of a milk hose 5 in sectional view. The end section 6 of the milk hose 5 has a conically extending cross section. The lateral surface of the extending cross section bears on the surface of the frustoconical section 2 of a coupling element 1. The edge region of the section 6 lies between the frustoconical section 2 and a wall 3. A clamping element 9 is provided for fixing the section 6 of the milk hose 5. The clamping element 9 partly reaches around the extending end section 6, such that the clamping element 9 presses the end section 6 against the frustoconical section 2 and the inner side of the wall 3 and also the bottom 4. It can be seen from the illustration according to FIG. 11 that the end section 6 has a conical extension 13, which interacts with a corresponding shaped portion of the clamping element 9. In the exemplary embodiment illustrated, the coupling element 1 is formed at the milk collecting component 7. This may involve for example an upper part of the housing of the milk collecting component 7.

FIGS. 13 to 17 illustrate a further embodiment of a connection between a milk hose 5 and a milk collecting component 7. This involves a modification of the embodiment illustrated in FIGS. 8 to 12. Identical parts are provided with identical reference symbols.

The difference between the two embodiments consists in the configuration of the clamping element 9 and of the end section 6 of the milk hose 5. It can be seen from the illustration according to FIG. 15 that the clamping element 9 has a slot 23. The end section 6 has a lug 22, which projects into the slot 23 in the mounted state.

Figures 15, 16, 17:
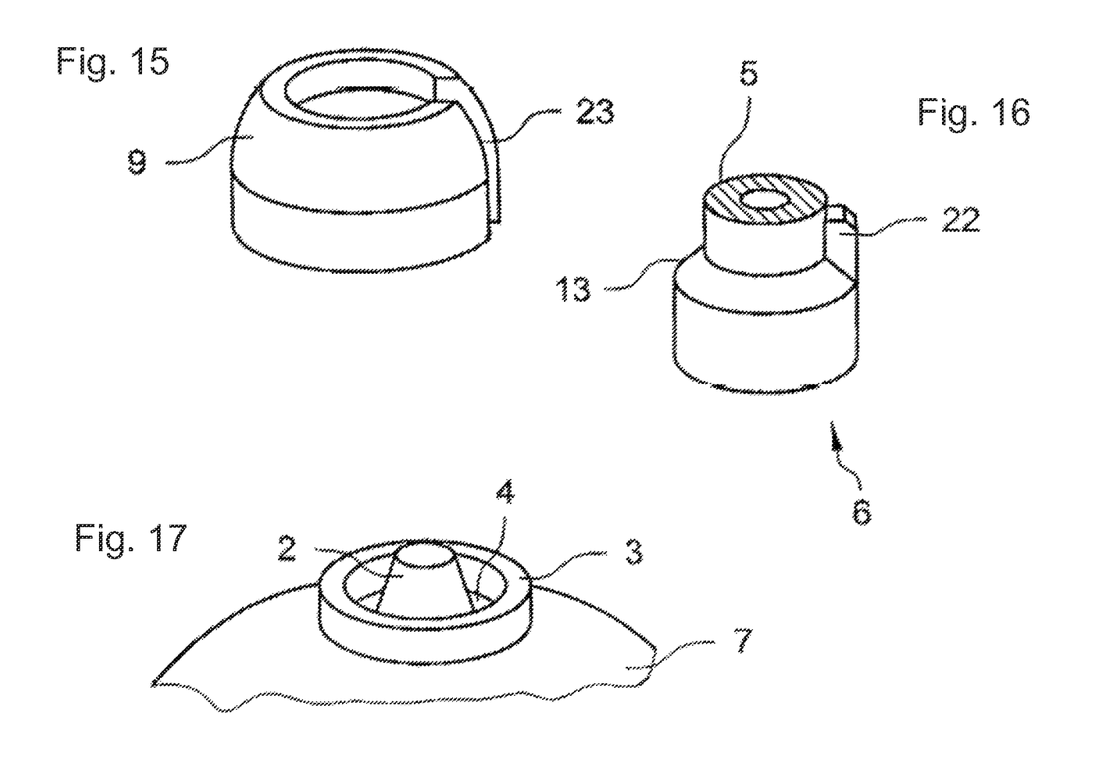
FIG. 15 shows the clamping element of the connection according to FIG. 13 in a perspective view.
FIG. 16 shows the end section of a milk hose according to FIG. 13 in a perspective view.
FIG. 17 shows a coupling element of the connection according to FIG. 13 in a perspective view.

The slot 23 has a width such that, by compressing a region between the end sections of the milk hose, the latter can be introduced into the clamping element 9 through the slot 23. The slot 23 acts with the lug 22 as a positioning unit, such that the milk hose can be mounted in a defined position with respect to the milk collecting component.

Figure 18:
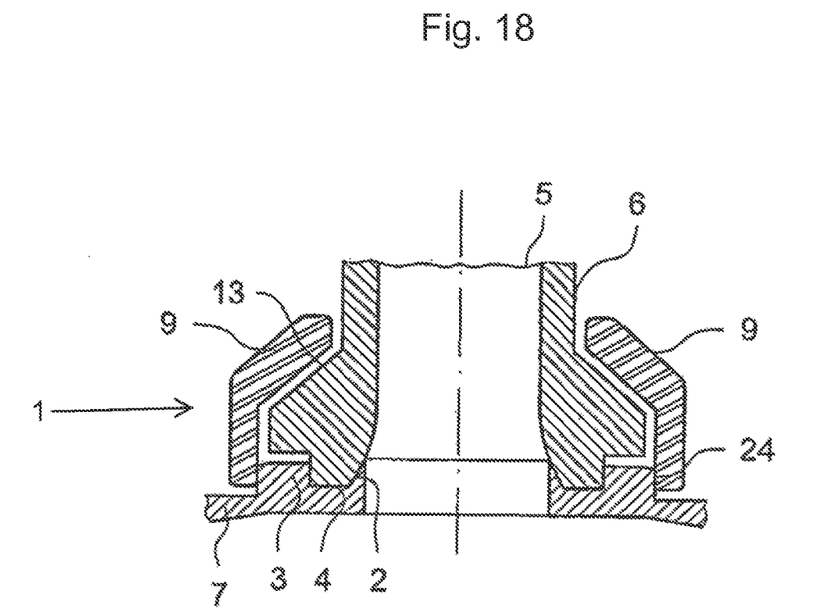
FIG. 18 shows a further exemplary embodiment in a sectional illustration of a milk hose connection to a milk collecting component.

FIG. 18 shows a second modification of the connection according to FIG. 8. Identical structural parts are provided with identical reference symbols. In the exemplary embodiment illustrated in FIG. 18, a thread is provided in each case on the outer side of the wall 3 and in the inner side of the clamping element 9, such that the clamping element 9 can be screwed to the coupling element 1.

Figure 19:
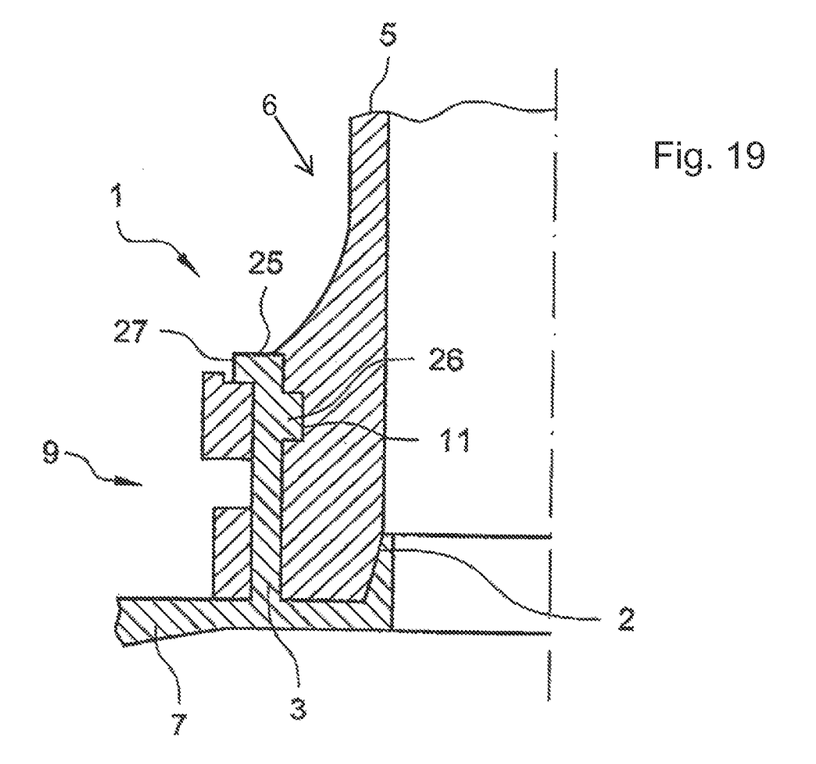
FIG. 19 shows yet another exemplary embodiment of a milk hose connection in a sectional illustration.

FIG. 19 illustrates yet another embodiment of a connection between a milk hose 5 and milk collecting component 7. The milk collecting component 7 has a coupling element 1. The coupling element 1 comprises a frustoconical section 2 projecting into the milk hose 5. A wall 3 is provided at a distance from the frustoconical section 2. The wall 3 is subdivided into individual webs 25 which can be pivoted elastically in the direction of the end section 6 of the milk hose 5. Each web 25 has a protrusion 26 engaging into a preferably peripheral groove 11 formed in the end section 6. A clamping element 9 is provided for fixing the milk hose 5, said clamping element surrounding the webs 25 in a ring-shaped manner. The clamping element 9 bears on the webs 25. The wall areas bearing on one another are preferably formed in such a way that they form a wedge, such that, by displacing the clamping element 9 in the direction of the free end of the web 25, this is pressed against the end section 6 of the milk hose and is fixed to the web 25. A stop 27 is provided for limiting the movement in the direction of the free end of the web 25.

The connection can be released by displacing the clamping element 9 in the direction of the milk collecting component.

The end section 6 of the milk hose can have a plurality of grooves 11 into which a corresponding number of protrusions 26 engage. There is also the possibility of the clamping element 9 being connected to the webs 25 via a thread, which is formed essentially in conical fashion. There is also the possibility of the milk hose being configured correspondingly, such that, in the unconnected state, the webs 25 are pressed outwards by the configuration of the end region of the milk hose and, by pushing up the clamping element 9, they are pressed against the end section 6 of the milk hose 5.

Figure 20:
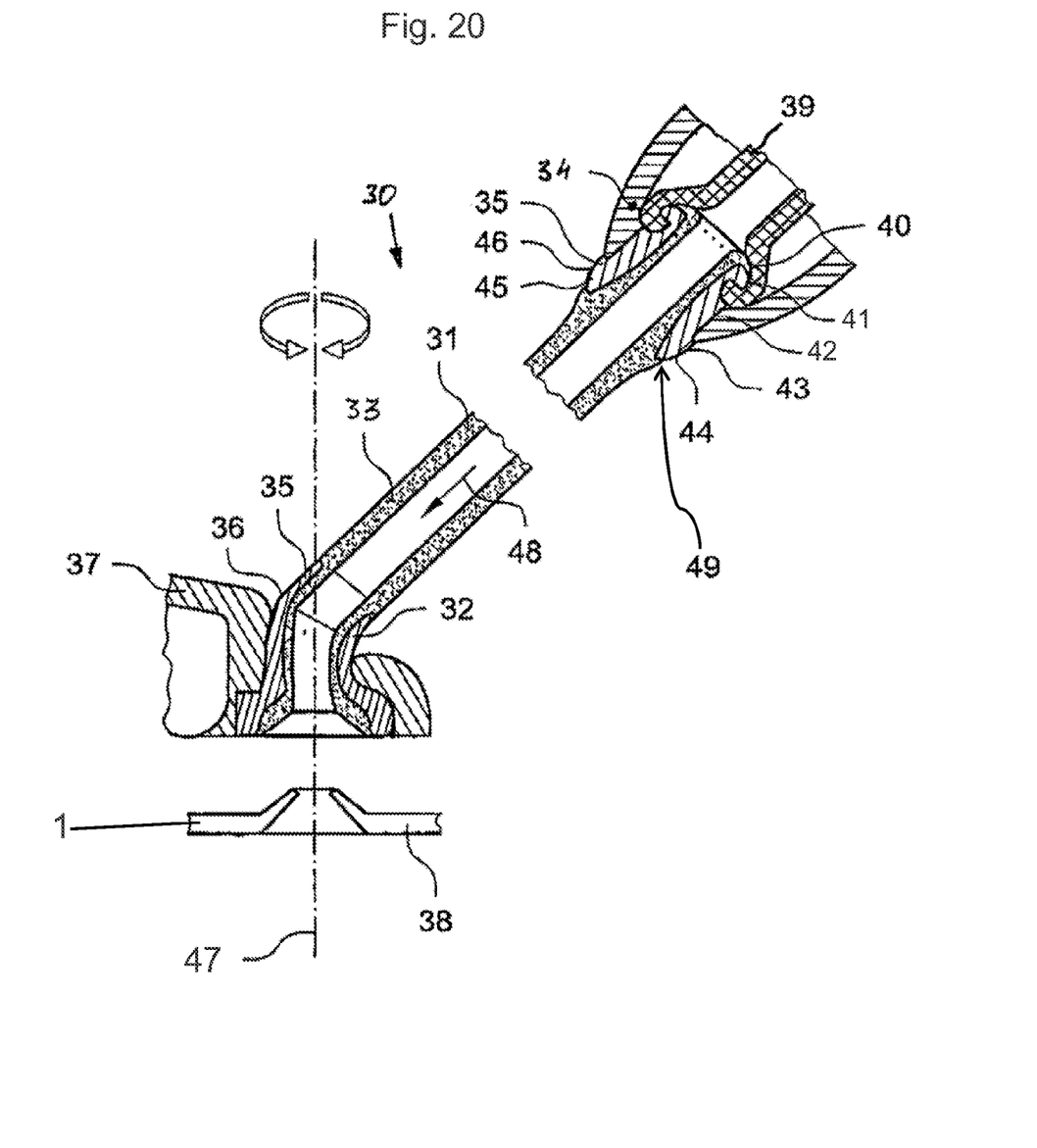
FIG. 20 shows an axial longitudinal section through a milk hose.

FIG. 20 illustrates an axial longitudinal section through a milk hose 30 according to the invention. The milk hose 30 has an intermediate region 31, a first end section 32 and a second end section 49. The intermediate region 31 is produced from a soft material 33. By contrast, the two end sections 32, 49 are produced from a hard material 35. The end sections 32, 49 illustrated in the present case are situated exclusively on the outer circumference of the milk hose 30. That is to say that milk which passes through the milk hose 30 in a milk flow direction 48 comes into contact only with the soft material 33 over the entire length of the milk hose 30. An angular region 36 can be discerned in the first end section 32. The angular region 36 leads into a cover 37 of a milk collecting container 38 (not illustrated in more detail). In part a milking cup 34 and likewise in part a teat rubber 39 are illustrated in the region of the second end section 49.

The milk hose 30 is mounted by a procedure in which, in a first step, the teat rubber 39 is led over the hard material 35 of the second end section 49 and brought to bear on a fixing area 40. The teat rubber 39 is prevented from inadvertently slipping away from the milk hose 30 by means of a collar 41, which is situated at one end of the milk hose 30 and is widened outwards in a radial direction. In the opposite direction thereto, the second end section 49 has a second collar 42, which prevents the teat rubber 39 from slipping away in the opposite direction. In the embodiment shown in the present case, the second collar 42 is simultaneously formed as a bearing area 43 of a latching means 44. In the assembled state, the bearing area 43 additionally serves for the positively locking fixing of the milk hose within the milking cup 34. For this purpose, the second end section 49 additionally has lead-in bevels 45 which facilitate the insertion of the assembled milk hose together with the teat rubber 39 into the milking cup 34. During insertion into the milking cup 34, the latching means 44 formed by the bearing area 43 are compressed in a radially inwardly facing direction, such that the second end section 49 can pass through the opening of smaller design in the milking cup 38.

In order to facilitate this procedure, partial cutouts are provided at the second end section 49, such that the latching means 44 can be deformed relatively easily during the assembly procedure. In the design of the milk hose 30 illustrated in the present case, the second end section 49 presses the teat rubber 39, the milking cup 34 and the milk hose 30 against one another, with the result that secure retention and at the same time good tightness are achieved.

Demounting can then take place by simple release of the latching means 44. After the release of the latching means 44, the milk hose together with the teat rubber can be removed from the milking cup 34 and replaced in a simple manner. If required, it is also possible for just a single component, such as the milk hose 30 or the teat rubber 39, for example, to be replaced separately in order then to perform the mounting in the opposite direction. In the embodiment illustrated, teat rubber 39 and milking cup 34 share a common fixing area 40 on the outer side of the second end section 49. In other alternative embodiments, however, they can also be shared between a plurality of separate fixing areas 40. This would lead to a separation of connecting and fixing means. While here the connecting means for the connection of the milk hose to the milking cup comprises the collar 41 and the latching means 44, the collar 41 and the collar 42 form the fixing means for fixing the teat rubber 39 to the milk hose 30. As stated, in other embodiments, if required, fixing and connecting means can be arranged separately from one another and be formed differently. In order to ensure particularly good adaptation of the milking unit to a wide variety of teat positions, the milk hose 30 is attached such that it can be rotated about an axis of rotation 47 relative to the milk collecting container 38. Alongside the angular region 36, the milk hose 30 therefore has a second possibility of adaptation to anatomical or spatial conditions.

The present invention is incidentally not restricted to the exemplary embodiments illustrated. Rather, numerous modifications of the invention are possible within the scope of the patent claims. Thus, by way of example, instead of the materials described, numerous other hard or soft materials can be employed or the configuration of the connecting and fixing means can be varied.

The invention claimed is:

1. A milking unit comprising:
   at least one milk hose having a first end section and a second end section;
   a milk collecting component connected to the first end section of the milk hose;
   a coupling element releasably connected to the first end section of the milk hose, wherein at least a portion of the first coupling element is substantially frustoconical in shape and projects at least partially into the first end section of the milk hose; and
   a clamping element releasably securing the first end section of the milk hose and the coupling element to create an essentially fluid-tight connection between the milk hose and the milk collecting component.

2. The milking unit according to claim 1, wherein the coupling element includes a wall spaced apart from the substantially frustoconical coupling element and the wall is releasably connected to the first end section of the milk hose.

3. The milking unit according to claim 2, wherein the clamping element is in resilient locking engagement with the wall.

4. The milking unit according to claim 1, wherein the first end section of the milk hose has an inner surface shaped to substantially correspond to a shape of the coupling element.

5. The milking unit according to claim 1, wherein the first end section of the milk hose defines a groove, and the clamping element includes a collar disposed at least partially in the groove to releasably connect the milk hose to the milk collecting component.

6. The milking unit according to claim 1, wherein the first end section of the milk hose further includes a plurality of spaced apart and radially outwardly extending segments, and the clamping element compresses at least one of the segments.

7. The milking unit according to claim 1, wherein the clamping element has at least one elastic segment extending in a radial direction.

8. The milking unit of claim 1, wherein the clamping element defines a slot; and
   the milk hose first end section comprises:
      a positioning lug disposed in the clamping element slot.

9. The milking unit of claim 1, wherein the clamping element defines a slot; and
   the milk hose first end section comprises:
      a radially extending positioning lug disposed in the clamping element slot.

10. The milking unit of claim 1, wherein the coupling element includes a wall spaced apart from the substantially frustoconical coupling element and the wall is releasably threaded to the first end section of the milk hose.

* * * * *